(12) United States Patent
Heo et al.

(10) Patent No.: US 9,412,368 B2
(45) Date of Patent: Aug. 9, 2016

(54) DISPLAY APPARATUS, INTERACTIVE SYSTEM, AND RESPONSE INFORMATION PROVIDING METHOD

(71) Applicant: SAMSUNG ELECTRONICS CO., LTD., Suwon-si (KR)

(72) Inventors: Hye-hyun Heo, Suwon-si (KR); Ki-suk Kim, Suwon-si (KR); Hae-rim Son, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 426 days.

(21) Appl. No.: 13/918,034

(22) Filed: Jun. 14, 2013

(65) Prior Publication Data

US 2014/0012585 A1 Jan. 9, 2014

(30) Foreign Application Priority Data

Jul. 3, 2012 (KR) ........................ 10-2012-0072448

(51) Int. Cl.
*G10L 21/00* (2013.01)
*G10L 15/22* (2006.01)
(Continued)

(52) U.S. Cl.
CPC .......... *G10L 15/22* (2013.01); *G06F 17/30864* (2013.01); *G10L 15/30* (2013.01);
(Continued)

(58) Field of Classification Search
CPC .............. G06F 3/167; G06F 17/30743; G06F 17/30899; G06F 3/0484; G06F 3/01; G06F 3/04842; G06F 3/04847; G06F 3/0488; G06F 9/50; G06F 17/30867; G06F 17/3089; G06F 17/30011; G06F 17/30265; G06F 17/3064; G06F 17/30247; G06F 17/30861; G10L 15/26; G10L 15/08; G10L 15/1822; G10L 15/24; G10L 15/30; G10L 15/22

USPC .............. 704/235, 251, 255, 257, 270, 270.1, 704/1–10, 250

See application file for complete search history.

(56) References Cited

U.S. PATENT DOCUMENTS 7,548,858 B2 6/2009 Wang
2002/0143550 A1 10/2002 Nakatsuyama
(Continued)

FOREIGN PATENT DOCUMENTS

EP 2339576 A2 6/2011
EP 2355093 A2 8/2011
(Continued)

OTHER PUBLICATIONS

Communication dated Nov. 11, 2013 issued by the European Patent Office in counterpart European Patent Application No. 13174664.6.
(Continued)

*Primary Examiner* — Huyen Vo
(74) *Attorney, Agent, or Firm* — Sughrue Mion, PLLC

(57) ABSTRACT

A display apparatus includes a voice collecting device which collects a user voice, a communication device which performs communication with an interactive server, and a control device which, when response information corresponding to the user voice sent to the interactive server is received from the interactive server, controls to perform a feature corresponding to the response information, and the control device controls the communication device to receive replacement response information, related to the user voice, through a web search and a social network service (SNS).

23 Claims, 10 Drawing Sheets

(51) Int. Cl.
  *H04N 21/233* (2011.01)
  *H04N 21/422* (2011.01)
  *H04N 21/4788* (2011.01)
  *G10L 15/30* (2013.01)
  *H04N 21/239* (2011.01)
  *H04N 21/482* (2011.01)
  *G06F 17/30* (2006.01)
  *H04H 60/72* (2008.01)
  *H04L 29/08* (2006.01)
  *H04L 29/06* (2006.01)

(52) U.S. Cl.
  CPC ........ *H04N 21/233* (2013.01); *H04N 21/2393* (2013.01); *H04N 21/42203* (2013.01); *H04N 21/4788* (2013.01); *H04N 21/4828* (2013.01); *H04H 60/72* (2013.01); *H04L 65/4076* (2013.01); *H04L 67/02* (2013.01)

(56) References Cited

U.S. PATENT DOCUMENTS

| | | | |
|---|---|---|---|
| 2002/0198716 A1 | 12/2002 | Zimmerman | |
| 2004/0176954 A1 | 9/2004 | Wang | |
| 2005/0120391 A1 | 6/2005 | Haynie et al. | |
| 2007/0265851 A1* | 11/2007 | Ben-David | G10L 15/30 704/270.1 |
| 2009/0030681 A1 | 1/2009 | Sureka et al. | |
| 2009/0217324 A1 | 8/2009 | Massimi | |
| 2011/0054900 A1 | 3/2011 | Phillips et al. | |
| 2011/0055256 A1 | 3/2011 | Phillips et al. | |
| 2011/0067059 A1* | 3/2011 | Johnston | G10L 15/30 725/39 |
| 2012/0316875 A1* | 12/2012 | Nyquist | G10L 15/30 704/235 |
| 2012/0317492 A1* | 12/2012 | Sheeder | G06F 3/01 715/738 |
| 2013/0182914 A1* | 7/2013 | Sakai | H04N 7/141 382/115 |

FOREIGN PATENT DOCUMENTS

| | | |
|---|---|---|
| JP | 201186021 A | 4/2011 |
| KR | 1020120011945 A | 2/2012 |
| RU | 2 360 281 C2 | 6/2009 |
| WO | 2012063360 A1 | 5/2012 |

OTHER PUBLICATIONS

International Search Report (PCT/ISA/210) dated Nov. 15, 2013 issued by the International Searching Authority in International Application No. PCT/KR2013/005841.

Written Opinion (PCT/ISA/237) dated Nov. 15, 2013 issued by the International Searching Authority in International Application No. PCT/KR2013/005841.

Communication dated Nov. 23, 2015 issued by the Russian Patent Office in Russian Patent Application No. 2015103239.

Communication issued Jul. 28, 2015, issued by Federal Service for Intellectual Property in counterpart Russian Patent Application No. 2015103239.

Communication dated Feb. 16, 2016, issued by the Mexican Institute of Industrial Property in counterpart Mexican Application No. MX/a/2014/014794.

Communication issued Jun. 20, 2016, issued by the European Patent Office in counterpart European Patent Application No. 13174664.6.

* cited by examiner

DISPLAY APPARATUS, INTERACTIVE SYSTEM, AND RESPONSE INFORMATION PROVIDING METHOD

CROSS-REFERENCE TO RELATED APPLICATIONS

This application claims the benefit under 35 U.S.C. §119 (a) from Korean Patent Application No. 10-2012-0072488 filed Jul. 3, 2012 in the Korean Intellectual Property Office, the disclosure of which is incorporated herein by reference in its entirety.

BACKGROUND

1. Field

Embodiments relate to a display apparatus, an interactive server, and a response information providing method. More particularly, embodiments relate to a display apparatus, an interactive server, and a response information providing method for providing response information corresponding to utterance voice of a user.

2. Description of the Related Art

In a related art, a display apparatus capable of voice recognition collects an utterance voice for a user, and sends the collected user utterance voice to an external server connected through a network. Then, in a related art, the display apparatus receives a user utterance voice-related information. Before the display apparatus receives the user utterance voice-related information, the user utterance voice-related information has been converted into a form which the display apparatus can recognize by the external server. After the display apparatus receives the user utterance voice-related information, the display apparatus analyzes the received utterance voice-related information, and identifies an implication for the user utterance voice. Then, the display apparatus performs a function corresponding to the user utterance voice based on the identified implication, and outputs a notice message for the user utterance voice depending on a need.

However, the related art display apparatus is limited to executing the function corresponding to the user utterance voice. The related art display apparatus executes only a function to perform or avoid the function corresponding to the user utterance voice.

When the display apparatus enters a voice recognition mode depending on the user request, the display apparatus displays command words that can control the operation of the display apparatus through the user utterance voice. Accordingly, the user can issue a voice command for performing an operation for a function which the user desires. The voice command is at least one of the command words displayed on the screen, related to operation control of the display apparatus.

In other words, the related art display apparatus can only perform the behavior corresponding to the user utterance voice or a re-request for the user utterance voice based on preset command words. However, the related art display apparatus cannot provide different response information with respect to various utterance voices of the user.

Accordingly, for solving the above problems, a method is sought in which the display apparatus receives information related to utterance voice from a user and provides response information about the user request through a web search based on information input from the user. However, there is a problem that the method cannot provide correct respond information to questions which the user requests.

SUMMARY

Embodiments have been developed in order to overcome the above drawbacks and other problems associated with the related art. An aspect of the present disclosure provides a display apparatus and a method that can provide more correct response information with respect to various utterance voices of a user.

The above aspects of the embodiments may be achieved by providing a display apparatus, which may include a voice collecting device which collects a user voice, a communication device which performs communication with an interactive server, and a control device which, when response information corresponding to the user voice sent to the interactive server is received from the interactive server, controls to perform a feature corresponding to the response information, and the control device controls the communication device to receive replacement response information, related to the user voice, through a web search and a social network service (SNS).

The display apparatus may further include an output device, and when an utterance element included within the user voice, with the non-provisionable message for the response information corresponding to the user voice, is received from the interactive server, the control device may control the output device to receive and output replacement response information related to the utterance element through the web search and the social network service.

When a user command for performing the web search is received, the control device may receive and output a result of the web search based on the utterance element.

When a user command for the social network service is received, the control device may generate a response request message based on the utterance element, send the response request message to a social network service (SNS) server which provides the social network service, and receive and output a response message, corresponding to the response request message from the SNS server.

Depending on the user command, the control device may send the response request message to a social network service (SNS) account of the user, and receive and output the response message from a SNS account linked with a SNS account of the user.

Depending on the user command, the control device may send the response request message to a social network service (SNS) account selected among SNS accounts linked with a SNS account of the user, and receive and output the response message from the selected SNS account.

Depending on the user command, the control device may send the response request message to a predetermined public SNS account, and receive and output the response message from a SNS account linked with the predetermined public SNS account.

When the response message is received, the control device may output notice information indicating that the response message has been received.

The interactive server may include a first server which converts the collected user voice into text information, and a second server which generates response information corresponding to the collected user voice which was converted into text information, and the control device may convert the collected user voice into a digital signal, send the digital signal to the first server, and when the text information for the collected user voice is received from the first server, send the text information to the second server and receive response information corresponding to the user voice.

When the user voice includes utterance elements related to an electronic program guide (EPG) or a control operation of the display apparatus, the control device may perform at least one function of outputting the response message and executing a function corresponding to the user voice based on the response information received from the second server.

The above aspects of the embodiments may be achieved by providing a response information providing method for providing response information appropriate to a user voice in a display apparatus, which may include collecting the user voice, sending the collected user voice to an interactive server, checking whether response information corresponding to the user voice is received from the interactive server, and performing a feature corresponding to the user voice based on the response information when the response information corresponding to the user voice is received, and the performing an function may include, receiving and outputting replacement response information related to the user voice through a web search and a social network service (SNS).

The performing a function may further include, when an utterance element, included in the user voice with the non-provisionable message for the response information corresponding to the user voice, is received from the interactive server, receiving and outputting replacement response information related to the utterance element through the web search and the social network service.

The performing an function may further include, when a user command for performing the web search is received, receiving and outputting a result of the web search based on the utterance element.

The performing an function may further include generating a response request message based on the utterance element when a user command for the social network service is received, sending the response request message to a social network service (SNS) server which provides the social network service, and receiving and outputting a response message, corresponding to the response request message from the SNS server.

The performing an function may further include sending the response request message to a social network service (SNS) account of the user, depending on the user command, and receiving and outputting the response message from a SNS account linked with a SNS account of the user.

The performing an function may further include sending the response request message to a social network service (SNS) account selected among SNS accounts linked with a SNS account of the user depending on the user command, and receiving and outputting the response message from the selected SNS account.

The performing an function may further include sending the response request message to a predetermined public SNS account depending on the user command, and receiving and outputting the response message from a SNS account linked with the predetermined public SNS account.

The performing an function may further include outputting notice information indicating that the response message has been received when the response message is received.

The interactive server may include a first server which converts the collected user voice into text information and a second server which generates response information corresponding to the collected voice which was converted into text information, and the sending the collected user voice to an interactive server may include sending a digital signal for the collected user voice to the first server, receiving the text information for the collected user voice from the first server, sending the received text information to the second server, and receiving response information corresponding to the user voice from the second server.

The performing an function may include performing at least one function of outputting the response message and executing a function corresponding to the user voice based on the response information received from the second server when the user voice includes utterance elements related to an electronic program guide (EPG) or a control operation of the display apparatus.

The above aspects of the embodiments may be achieved by providing a display apparatus, which may include a voice collecting device which collects a user voice, removes noise from the collected user voice, and sends a filtered user voice to a communication device, a photographing device which photographs a face of a user, generates a face image, and sends the face image to the communication device, the communication device sends the filtered user voice and the face image to an interactive server, which provides response information appropriate to the filtered user voice and the face image, and a control device performs an operation corresponding to the filtered user voice and the face image based on the response information received from the interactive server.

When a non-provisionable message for the response information is received from the interactive server, the control device may control the communication device to receive replacement response information related to the filtered user voice and the face image through at least one of a web search and a social network service.

The above aspects of the embodiments may be achieved by providing an interactive system providing response information appropriate to a user voice, which may include a display apparatus which recognizes the user voice, and performs a function corresponding to the recognized user voice and an interactive server which, when a user voice is received from the display apparatus, converts the user voice into text information, analyzes the text information, and transmits response information corresponding to the user voice to the display apparatus, and the display apparatus performs a function corresponding to the response information received from the interactive server, or perform a function related to the user voice based on replacement response information received through a web server and a SNS server.

With various embodiments, even when various user voices are input from various users, a display apparatus can provide more correct response information for each of the user voices.

Other objects, advantages, and salient features of the embodiments will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to similar parts, components and structures.

DETAILED DESCRIPTION OF EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
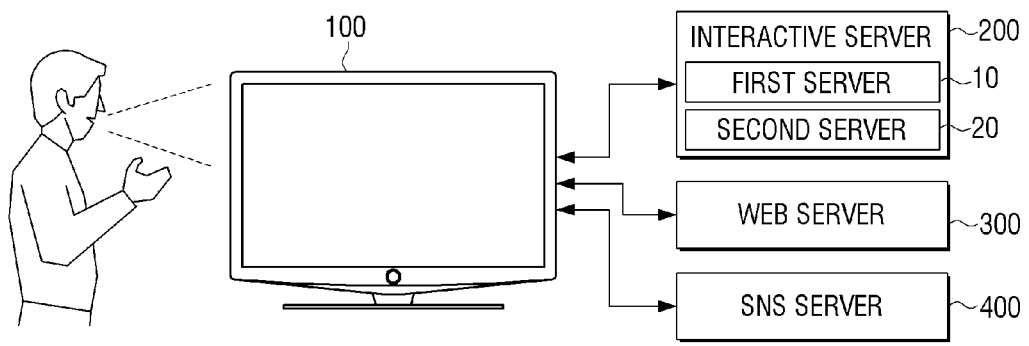
FIG. 1 is a block diagram illustrating an interactive system to provide response information appropriate to a user voice according to an embodiment of the present disclosure.

FIG. 1 is a block diagram illustrating an interactive system to provide response information appropriate to a user voice according to an embodiment of the present disclosure.

As illustrated in FIG. 1, an interactive system according to an embodiment of the present disclosure includes a display apparatus 100, an interactive server 200, a web server 300, and a Social Networking Service (SNS) server 400. The display apparatus 100 is an apparatus that can access the internet and recognize a user voice. The display apparatus may be implemented as various electronic apparatuses, e.g., smart TVs, cell phones, e.g., smart phones, desktop PCs, notebook PCs, navigation devices, etc. When a user voice is input from a user, the display apparatus 100 converts the input user voice into a digital signal, and sends the digital signal to the interactive server 200.

The display apparatus 100 recognizes a user voice input from a user, and performs a function corresponding to the recognized user voice. To be specific, the display apparatus 100 converts the input user voice into a digital signal, and sens the digital signal to the interactive server 200.

Then, when response information corresponding to the user voice from the interactive server 200 is received, the display apparatus 100 performs an function corresponding to the user voice based on the received response information.

In addition, the display apparatus 100 performs a function corresponding to the user voice based on replacement response information received through the web server 300 and the SNS server 400.

The interactive server 200 is a server that provides utterance information suited to the user voice in conjunction with the display apparatus 100.

Once a user voice is received from the display apparatus 100, the interactive server 200 converts the received user voice into text information in association with the display apparatus 100, analyzes the text information, and transmits response information corresponding to the user voice received from the display apparatus 100 to the display apparatus 100.

The interactive server 200 consists of a first server 10 and a second server 20. The first server 10 converts the user voice received from the display apparatus 100 into text information, and sends the user voice, which was converted into the text information, to the display apparatus 100. Then, when the user voice, which was converted into the text information, is received from the display apparatus 100, the second server 20 analyzes the received text information, generates response information corresponding to the user voice, and sends the response information to the display apparatus 100.

In the present disclosure, the interactive server 200 generates response information corresponding to the user voice through the first and second servers 10 and 20, and sends the response information to the display apparatus 100. However, this is only one embodiment of the present disclosure. According to the implementation method, the interactive server 200 may be a single server. Since the single interactive server 200 performs all operations of the first server 10 and the second server 20, detailed explanations with respect to the single interactive server 200 will be omitted hereinafter.

The web server 300 is a server that provides web-search result information according to the request of the display apparatus 100.

As described above, the web server 300 which provides replacement response information to the display apparatus 100 is a server which provides web search result information according to a request from the display apparatus 100 connected via Internet. The web server 300 is connected to the internet. The social networking service (SNS) server 400 is a server that provides a social networking service (hereinafter, SNS), e.g., Twitter, Facebook, etc. The SNS is used by users to form human networks on the Web. Therefore, information sharing and communities between the users can be performed through the SNS.

Hereinafter, an operation for providing response information appropriate to a user voice through each configuration of the above-described interactive system will be explained.

When a user voice is input from a user, the display apparatus 100 collects the input user voice, and performs an function corresponding to the input user voice. For example, when a user voice for changing a channel is input, the display apparatus 100 can tune to the input channel and display the corresponding channel. The display apparatus 100 can provide a response message corresponding to the function of the input user voice. In the example as described above, the display apparatus 100 can output information with respect to the changed channel in voice or in text image form. When a user voice is input which inquires about the airtime of a particular program, the display apparatus 100 can output the particular program airtime in voice or in text image form.

The display apparatus 100 converts the collected user voice into a digital signal and sends it to the first server 10. Then, according to a specific pattern for the user voice received from the display apparatus 100, the first server 10 generates text information for the user voice, and sends the text information to display apparatus 100. A detailed explanation of generating the text information from the user voice will be omitted.

The display apparatus 100, which receives the text information for the user voice from the first server 10, sends the text information for the user voice to the second server 20. Then, the second server 20 analyzes a meaning of the text information for the user voice received from the display apparatus 100, and determines whether response information to control the function of the display apparatus 100 can be generated.

The second server 20 extracts at least one utterance element from the text information for the user voice, and determines whether the response information related to the user voice can be generated based on the extracted utterance element. The response information is information to perform an function corresponding to the user voice. The response information may include at least one of a response message and a control command to control the execution of the function of the display apparatus 100. Also, the utterance element may be core keywords for performing the function requested by the user voice. The utterance element may include a dialog act, a main goal, and a core element.

The dialog act refers to a label to represent illocutionary force for the user's voice. For example, the dialog act may be a statement, a request, a question, etc. The main goal refers to a label to represent an actual intent of the user voice. The main goal may be turning the TV on/off, searching for a program, searching for a program schedule, reserving a program, etc. The core element may include a genre, a program name, time, a channel name, an actor or actress name, etc.

For example, when the user voice is "What time does (inserted broadcast program name) start?" the dialog act may be a question of "start?", and the main goal may be searching for a program schedule of "start". Then, the core element may be a program name of "(inserted broadcast program name)".

After the user voice of "What time does (inserted broadcast program name) start?" is received, the second server 20 may extract the utterance element including the dialog act, main goal, and core element from the received user voice. After the utterance element is extracted from the user voice, the second server 20 can determine whether to generate response information for performing an function corresponding to the user voice based on the extracted utterance element.

From the determination result, when it is possible to generate the response information for performing the function corresponding to the user voice, the second server 20 generates the response information for performing the function corresponding to the user voice, and sends it to the display apparatus 100.

In the above-described embodiment, after the utterance element for the user's voice of "What time does (inserted broadcast program name) start?" is extracted, the second server 20 generates response information for broadcast time information when the broadcast program starts based on the extracted utterance element, and sends it to the display apparatus 100. Then, the display apparatus 100 can output a response message of "(inserted broadcast program name) will start at 7:00." in voice or in text image form based on the received response information.

On the other hand, according to the determination result, when it is impossible to generate the response information for performing the function corresponding to the user voice, the second server 20 may generate a non-provisionable message for the user voice, and send it to the display apparatus 100.

For example, when text information for the user's voice of "Who is a changed emcee in (inserted broadcast program name)?" is received, the second server 20 can extract the utterance elements of "(inserted broadcast program name)", "changed", "emcee", and "who". After the utterance elements are extracted, the second server 20 checks whether there is information about a new emcee for (inserted broadcast program name) in pre-stored Electronic Program Guide (EPG) information based on the extracted utterance elements. From the check result of the second server 20, if it is not possible to obtain the information about the new emcee for (inserted broadcast program name) from the pre-stored EPG information, the second server 20 sends the non-provisionable message for the user voice to the display apparatus 100. Therefore, the display apparatus 100 can output a notice message such as "Information can not be found." through at least one of voice and text image form, based on the non-provisionable message received from the second server 20. In addition, when the non-provisionable message for the user voice is received from the second server 20, the display apparatus 100 outputs a replacement information providing message such as "Do you want to receive it by the web search or the social network service?" through at least one of voice and text image form.

In a state that the replacement information providing message is output, when a user command is input from the user for performing the web search, the display apparatus 100 receives a result of the web search from the web server 300, based on the utterance element extracted from the second server 20, and outputs the result of the web search through at least one of a voice and an image. According to an embodiment, the display apparatus 100 may receive the utterance elements extracted from the user voice, along with the non-provisionable message for the user voice, from the second server 20. Accordingly, when the user command for performing the web search is input, the display apparatus 100 can receive the result of the web search from the web server 300, based on the utterance elements received from the second server 20.

According to alternative embodiment, the display apparatus 100 receives keyword searches input from the user, for performing the web search, and can receive the web search result from the web server 300 based on the input keyword searches.

When a user command for SNS is received from the user, the display apparatus 100 generates a response request message based on the utterance elements extracted from the second server 20. According to an embodiment, the display apparatus 100 may receive the utterance elements extracted from the user voice, along with the non-provisionable message for the user voice, from the second server 20. Accordingly, when the user command for SNS is received, the display apparatus 100 can generate a response request message based on the utterance elements received from the second server 20. According to another embodiment, the display apparatus 100 can generate the response request message based on input data from the user.

After the response request message is generated, the display apparatus 100 sends the generated response request message to the SNS server 400. Accordingly, the SNS server 400 receives a response message related to the response request message from a SNS account linked with a SNS account of the user which sent the response request message, or a SNS account selected by the user, among a plurality of SNS accounts, linked with the SNS account of the user. Then, the SNS server 400 sends the received response message to the display apparatus 100. When there is no SNS account of the user that sent the response request message, the SNS server 400 can receive the response message, related to the response request message, from a public SNS account linked with a predetermined public SNS account. Then, the SNS server 400 sends the received response message to the display apparatus 100. Accordingly, the display apparatus 100 outputs the response message received from the SNS server 400 through at least one of voice and text image form.

If it is not possible to provide response information corresponding to the user voice, the interactive system, according to an embodiment of the present disclosure, uses the web search and the SNS to provide a user with replacement response information related to the user voice. Therefore, a failure probability of the provision of response information for the user voice may be minimized.

In an interactive system, according to an embodiment of the present disclosure, an operation to provide response information appropriate to the user voice has been explained. Hereinafter, in the interactive system, according to an embodiment of the present disclosure, a detailed method for providing response information appropriate to the user voice will be explained.

Figure 2:
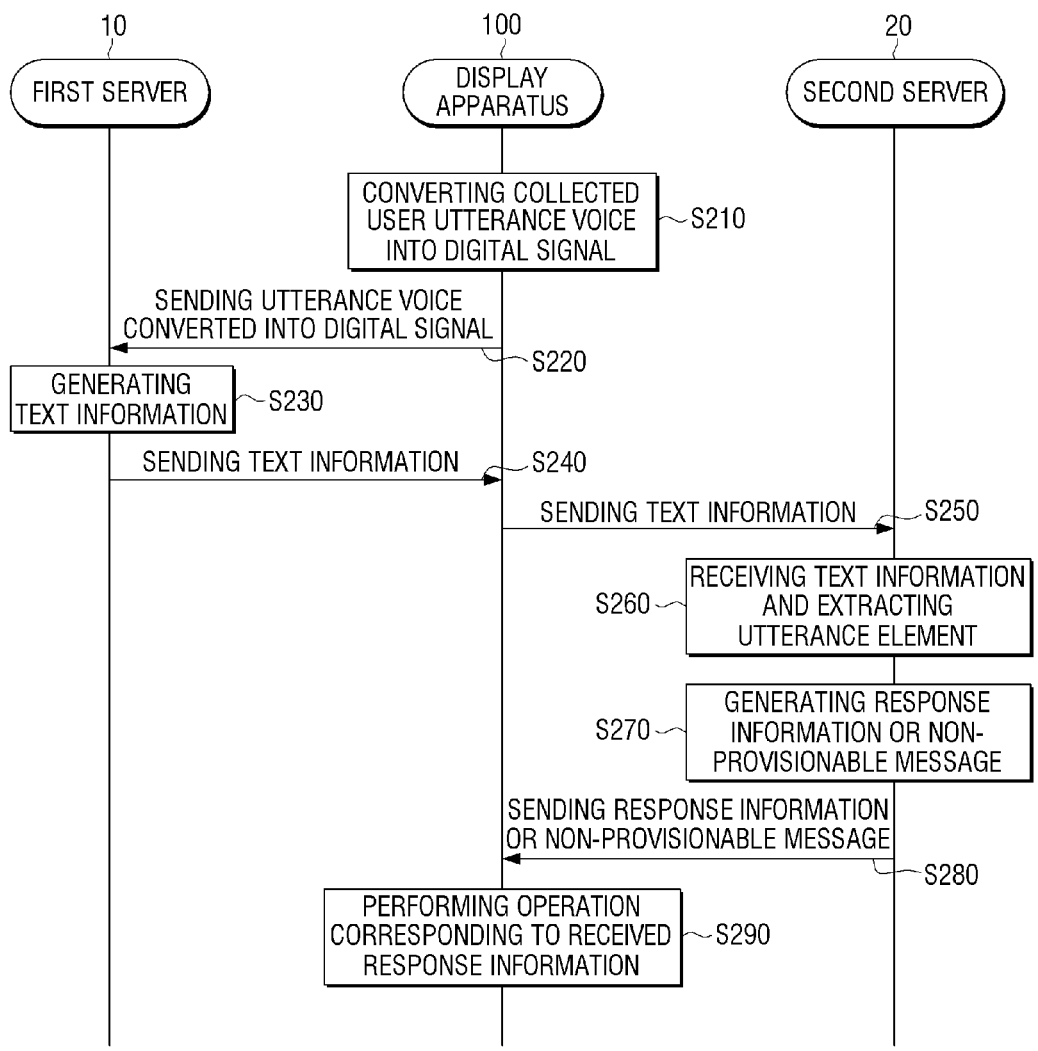
FIG. 2 is a procedure diagram illustrating a method for providing response information appropriate to a user voice in an interactive system according to an embodiment of the present disclosure.

FIG. 2 is a procedure diagram, illustrating a method for providing response information appropriate to a user voice in an interactive system, according to an embodiment of the present disclosure.

As illustrated in FIG. 2, when a user voice is input, the display apparatus 100 collects the inputted user voice. Then, the display apparatus 100 converts the collected user voice into a digital signal, and sends the user voice, which was previously converted into the digital signal, to the first server 10 (S210 and S220). Then, the first server 10 generates the user voice, which was previously converted into the digital signal in the display apparatus 100, into text information. Then, the first server 10 sends the generated text information to the display apparatus 100 (S230 and S240). Then, the display apparatus 100 sends the text information received from the first server 10 to the second server 20 (S250). The second server 20, which receives the user voice previously converted into the text information from the display apparatus 100, extracts utterance elements from the received text information (S260). The operation for extracting the utterance elements from the text information for the user voice in the second server 20 was explained with reference to FIG. 1. Thus, further explanation will be omitted.

After the utterance elements are extracted, the second server 20 generates response information for performing an function corresponding to the user voice based on the extracted utterance elements, or a non-provisionable message about the response information corresponding to the user voice. Then, the second server 20 sends the generated response information or non-provisionable message to the display apparatus 100 (S270). After receiving the response information corresponding to the user voice, the display apparatus 100, which receives the response information or non-provisionable message from the second server 20, performs the function corresponding to the user voice based on the received response information (S280,S290).

According to an embodiment of the present disclosure, the second server 20 determines whether the utterance element, which was extracted from the text information, is an utterance element related to the pre-stored EPG information or an utterance element related to control commands of the display apparatus 100. From the determination result, when the extracted utterance element is the utterance element related to the pre-stored EPG information or the utterance element related to the control commands of the display apparatus 100, the second server 20 generates response information corresponding to the user's voice. Then, the second server 20 sends the generated response information to the display apparatus 100. Then, the display apparatus 100 performs at least one function of outputting the response information and executing the function corresponding to the user voice based on the received response information.

When the extracted utterance element is not the utterance element related to the pre-stored EPG information nor the utterance element related to the control commands of the display apparatus 100 based on the determination result, the second server 20 generates a non-provisionable message for the response information corresponding to the user voice, and sends it to the display apparatus 100. Then, the display apparatus 100 outputs a notice message, such as "Information cannot be found", through at least one of voice and text image form based on the non-provisionable message received from the second server 20. When the non-provisionable message for the user voice from the second server 20 is received, the display apparatus 100 outputs a replacement information providing message, e.g., "Do you want to receive it by the web search or the social network service?" through at least one of voice and text image form. Then, depending on the user command selected by the user, the display apparatus 100 receives replacement response information related to the user voice through the web server 300 or the SNS server 400, and outputs the replacement response information through at least one of voice and image.

A method for providing replacement response information related to the user voice through the display apparatus 100 in the interactive system will be explained.

Figure 3:
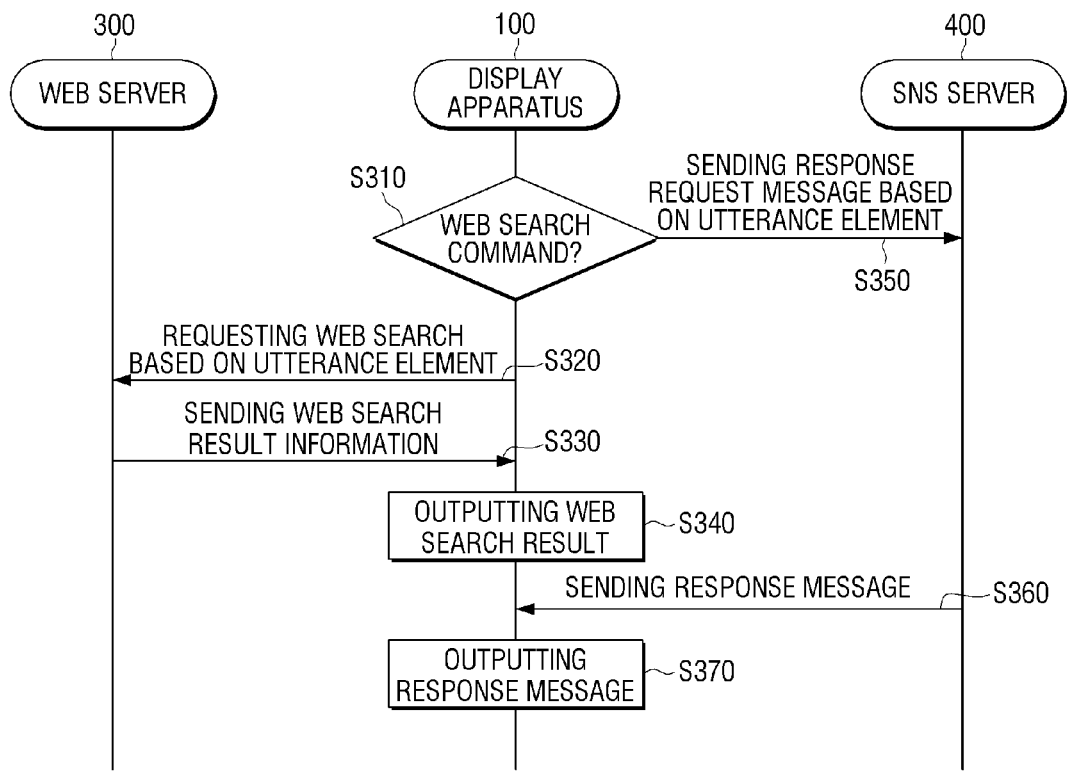
FIG. 3 is a procedure diagram illustrating a method for providing replacement response information related to a user voice in an interactive system according to an embodiment of the present disclosure.

FIG. 3 is a procedure diagram illustrating a method for providing replacement response information related to a user voice in an interactive system, according to an embodiment of the present disclosure.

When a non-provisionable message for the user voice is received from the second server 20, the display apparatus 100 outputs a non-provisionable message, such as "Information cannot be founded", through at least one of voice and text image form. Then, the display apparatus 100 outputs a replacement information providing message, e.g., "Do you want to receive it by the web search or the social network service?", through at least one of voice and text image form. In a state that the replacement information providing message is output, the display apparatus 100 determines whether a user command for performing the web search or a user command for the SNS is input from the user (S310). When the user command is a command for performing the web search based on the determination result, the display apparatus 100 requests the web search based on the utterance element extracted from the user voice to the web server 300, and receives result information of the web search (S320 and S330).

According to an embodiment of the present disclosure, the display apparatus 100 can receive the utterance element extracted from the user voice along with the non-provisionable message for the user voice. Accordingly, when the user command for performing the web search is input, the display apparatus 100 can receive web search result information from the web server 300 based on the utterance element received from the second server 20. According to another embodiment of the present disclosure, the display apparatus 100 can receive keyword searches input by the user for performing the web search, and receives a web search result from the web server 300 based on the inputted keyword searches. After the web search result information is received from the web server 300, the display apparatus 100 outputs the received web search result information in a voice or an image (S340).

On the other hand, in step S310, if the user command is determined to be a command for the SNS, the display apparatus 100 generates a response request message based on the utterance element extracted from the user voice. Then, the display apparatus sends the response request message to the SNS server 400 (S350).

According to an embodiment of the present disclosure, the display apparatus 100 can receive the utterance element extracted from the user voice, along with a non-provisionable message for the user voice, from the second server 20. Accordingly, when the user command for the SNS is received, the display apparatus 100 can generate a response request message based on the utterance element received from the second server 20. According to another embodiment of the present disclosure, the display apparatus 100 can generate the response request message based on input data from the user.

After the response request message is generated, the display apparatus 100 sends the generated response request message to the SNS server 400(S360). Then, the SNS server 400 receives a response message related to the response request message from a SNS account linked with a SNS account of the user that sent the response request message, or a SNS account that is selected by the user among the linked SNS accounts. On the other hand, if there is no SNS account of the user that sent the response request message, the SNS server 400 can receive the response message related to the response request message from a public SNS account linked with a predetermined public SNS account. Accordingly, the display apparatus 100 can output the response message received from the SNS server 400 through at least one of voice and text image form (S370).

Hereinafter, configuration of the display apparatus 100 to provide response information appropriate to a user voice will be explained.

Figure 4:
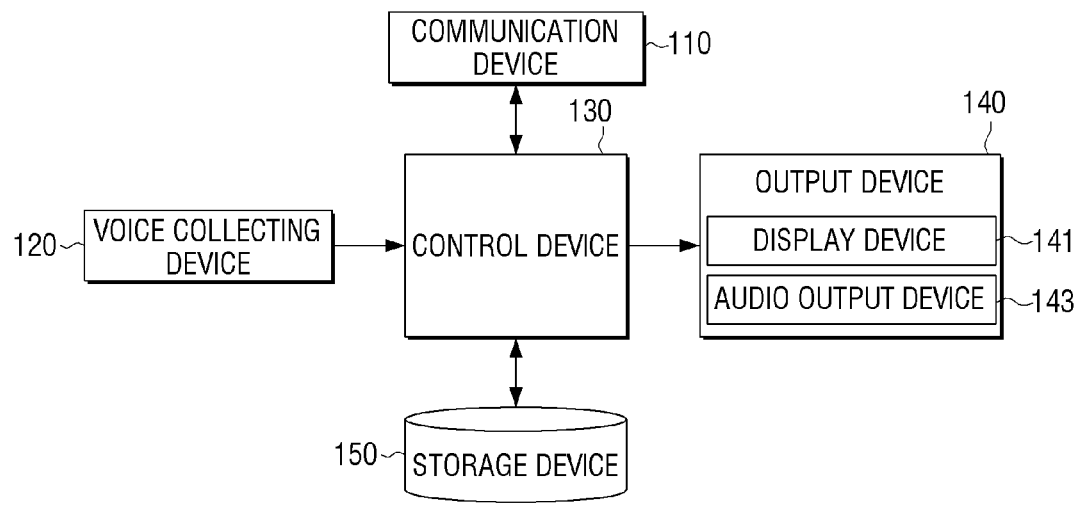
FIG. 4 is a block diagram illustrating a display apparatus according to an embodiment of the present disclosure.

FIG. 4 is a block diagram illustrating a display apparatus according to an embodiment of the present disclosure.

As illustrated in FIG. 4, the display apparatus 100 includes a communication device 110, a voice collecting device 120, a control device 130, an output device 140, and a storage device 150.

The communication device 110 performs communication with an interactive server 200 that provides response information appropriate to the user voice. In detail, the communication device 110 can perform communication with a first server 10 and a second server 20 of the interactive server 200 through various communication methods to receive response information corresponding to the user voice. The communication device 110 may include various communication modules, e.g., a local wireless communication module (not illustrated), a wireless communication module (not illustrated), etc. The local wireless communication module (not illustrated) is a communication module that performs wireless communication with external devices located in the local area, e.g., Bluetooth, Zigbee, etc. The wireless communication module (not illustrated) is a module that is connected to external networks and performs communication according to a wireless communication protocol such as Wi-Fi, IEEE, etc. In addition, the wireless communication module may include a mobile communication module, connected to mobile communication networks according to various mobile communication standards, i.e., third generation (3G), third generation partnership project (3GPP), long term evolution (LTE), etc., to perform communication.

The voice collecting device 120 processes the collected user voice, and generates a user voice signal. In other words, the voice collecting device 120 removes noise (e.g., air conditioner sound, cleaner sound, the sound of music, etc.) from the collected user voice, and generates the user voice signal. When a user voice in the form of analog is entered, the voice collecting device 120 performs sampling of the user voice, and converts it into a digital signal. At this time, the voice collecting device 120 determines whether there is noise in the user voice, which has been converted into the digital signal. If there is noise, the voice collecting device 120 may remove the noise from the converted digital signal. As described above, after the user voice is converted into the digital signal through the voice collecting device 120, the communication device 110 sends the user voice converted into the digital signal to the first server 10. The first server 10 is a server that converts the user voice into text information.

Therefore, after the user voice is converted into a digital signal through the voice collecting device 120. Then, the communication device 110 sends the converted digital signal to the first server 10. The first server 10 converts the user voice, which was converted into the digital signal, into text information. Then, the first server 10 sends the text information to the display apparatus 100. Then, after the user voice, which was converted into the text information, is received from the first server 10, the communication device 110 sends the user voice, which was converted into the text information, to the second server 20.

The control device 130, after receiving response information corresponding to the user voice, which was converted into the text information from the second server 20, controls an function to perform, corresponding to the user voice, based on the received response information. After the user voice is input, the control device 130 converts the user voice into the digital signal through the voice collecting device 120. Then, the control device 130 sends the user voice, which was converted into the digital signal, to the first server 10 through the communication device 110. The control device 130 receives text information for the user voice from the first server 10. After the text information for the user voice is received from the first server 10, the control device 130 can send the user voice, which was converted into the text information, to the second server 20 through the communication device 110. Then, control device 130 can receive response information corresponding to the user voice.

When a non-provisionable message for the response information corresponding to the user voice is received from the second server 20, the control device 130 can control the communication device 110 to receive replacement response information related to the user voice through at least one of the web search and SNS.

The output device 140 outputs at least one of a voice and an image. When the response information corresponding to the user voice is received from the second server 20, or when the replacement response information is received from at least one of the web server 300 and the SNS server 400, the output device 140 can output a response message for the user voice in voice or in text image form, based on the received response information or replacement response information, according to a control command of the control device 130. The output device 140 may have a display device 141 and an audio output device 143.

The display device 141 may be implemented as a liquid crystal display (LCD), an organic light emitting display (OLED), or a plasma display panel (PDP), etc., and can provide various display images that can be provided through the display apparatus 100. Specifically, the display device 141 can display the response message corresponding to the user voice in a text form or in an image form. The display device 141 may be implemented as a form of a touch screen, to form a layer structure along with a touch pad. The touch screen may be formed to detect a location, an area, and a pressure of a touch input.

The audio output device 143 may be implemented as output ports, e.g. speakers, jacks, etc., and may output the response message for the user voice in a voice form.

The response information received from the second server 20 may be generated in different forms, depending on the functions that are classified based on the utterance element extracted from the user voice. The functions that are classified based on the extracted utterance element may include at least one of EPG related functions, and functions related to function controls of the display apparatus 100. If the utterance element extracted from the user voice is related to a broadcast program, the response information may be the EPG related function. If the utterance element is related to power on/off, channel changes, volume changes, etc. of the display apparatus 100, the response information may be the function related to the function control of the display apparatus 100. Therefore, when the response information is received from the second server 20, the control device 130 can control an function to perform corresponding to the user voice based on the received response information.

For example, when a user voice of "Record (inserted broadcast program name) that is broadcast today" is input, the control device 130 converts the user's voice of "Record (inserted broadcast program name) that is broadcast today" into a digital signal, through the voice collecting device 120. Then, the control device 130 may send the converted user voice to the first server 10. When text information for the user voice of "Record (inserted broadcast program name) that is broadcast today" is received from the first server 10, the control device 130 sends the text information for the user voice of "Record (inserted broadcast program name) that is broadcast today" to the second server 20.

Accordingly, the second server 20 extracts utterance elements such as "today", "(inserted broadcast program name)", and "record" from the received text information for the user voice of "Record (inserted broadcast program name) that is broadcast today", and determines it as the EPG related function based on the extracted utterance elements. Then, the second server 20 sends response information, including a control command for schedule recording for (inserted broadcast program name) and a response message of "Recording for (inserted broadcast program name) has been scheduled" to the display apparatus 100. The control device 130 sets a scheduled recording for the (inserted broadcast program name) according to the control command, included in the response information received from the second server 20. Then, the control device 130 controls the output device 140 to output the response message of "Recording for (inserted broadcast program name) has been scheduled" through at least one of image and voice, based on the response message included in the received response information.

According to the control command, the output device 140 can output the response message of "Recording for (inserted broadcast program name) has been scheduled" in voice or in text image form, through at least one of the display device 141 and the audio output device 143.

On the other hand, the control device 130 may receive a user voice not related to the EPG related functions or the functions to control functions of the display apparatus 100 from the user. For example, when a user voice, including limited utterance elements, e.g., abusive language or prohibited drugs, is input from the user, the control device 130 receives text information for the input user voice from the first server 10, and sends it to the second server 20. After utterance elements are extracted from the text information for the user voice, the second server 20 checks whether the extracted utterance elements are pre-stored limited utterance elements. From the check result, when the extracted utterance element is the limited utterance elements, e.g., abusive language or prohibited drugs, the second server 20 generates a non-provisionable message for the user voice, and sends the non-provisonable message to the display apparatus 100. Accordingly, the control device 130 controls the output device 140 to output a notice message such as "Function can not be performed" or "The voice is limited. Please re-enter" through at least one of voice and text image form based on the received non-provisionable message.

However, the present disclosure is not limited to the embodiments. Thus, if a user voice related to abusive language or prohibited drugs is input, the control device 130 can determine whether to perform an function for the user voice referring to an utterance element-related table that is pre-stored in the storage device 150. The utterance element-related table, pre-stored in the storage device 150, is a table that was pre-set and stored by the user to limit functions corresponding to the user voice. Therefore, the control device 130 can determine whether to perform an function for the user voice, referring to the utterance element-related table preset by the user.

When a user voice of "Who is a changed emcee in (inserted broadcast program name)?" is input from the user, the control device 130 sends the text information for the user voice of "Who is a changed emcee in (inserted broadcast program name)?" received from the first server 10 to the second server 20. The second server 20, that receives the text information for the user voice, can extract utterance elements such as "(inserted broadcast program name)", "emcee", "No hong chul", "whom", and "replaced" from the text information for the user voice of "To whom is a emcee of (inserted broadcast program name) replaced from No hong chul?" After the utterance element is extracted, the second server 20 checks whether there is information related to a new emcee for (inserted broadcast program name) from the pre-stored EPG information based on the extracted utterance elements. From the check result, if the information related to the new emcee for (inserted broadcast program name) cannot be obtained from the pre-stored EPG information, the second server 20 sends a non-provisionable message for the user voice to the display apparatus 100.

After the non-provisionable message is received, the control device 130 controls the output device 140 to output a notice message such as "Information that can not be found" through at least one of voice and text image form based on the received non-provisional message. In addition, after the non-provisionable message for the user voice is received from the second server 20, the control device 130 generates a replacement information providing message such as "Do you want to receive it by the web search or the social network service?" through at least one of voice and text image form. Then, the control device 130 controls the output device 140 to output the generated replacement information providing message through at least one of a voice and an image.

Figure 5:
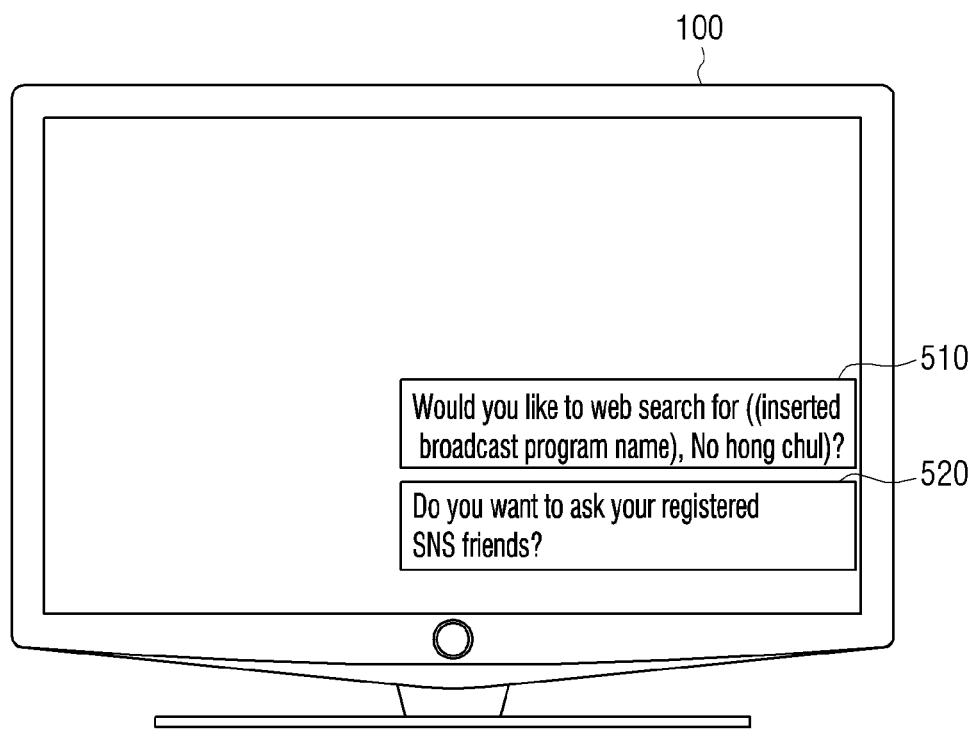
FIG. 5 is a diagram illustrating a display apparatus according to an embodiment of the present disclosure which outputs a replacement information providing message.

FIG. 5 is an example diagram illustrating a display apparatus, according to an embodiment of the present disclosure, which outputs a replacement information providing message.

As illustrated in FIG. 5, the output device 140 can output the replacement information providing message through the display device 141 according to the control command of the control device 130. In other words, the display device 141 can output a first replacement information providing message 510 related to the web search of "Would you like to web search for ((inserted broadcast program name), No hong chul)?", and a second replacement information providing message 520 related to the SNS of "Do you want to ask your registered SNS friends?" in a text form on a screen of the display device 141. Then, the audio output device 143 can output the first replacement information providing message 510 related to the web search of "Would you like to web search for ((inserted broadcast program name), No hong chul)?" and the second replacement information providing message 520 related to the SNS of "Do you want to ask your registered SNS friends?" in an audible form of voice through a speaker (not illustrated).

The second server 20 sends only utterance elements related to main nouns or objects, among the utterance elements extracted from the user voice to the display apparatus 100, along with the non-provisionable message for the user voice. Accordingly, the control device 130 generates the first and second replacement information providing messages 510 and 520, based on the main nouns or objects received from the second server 20, and controls the output device 140 to output the generated first and second replacement information providing messages 510 and 520, as in a voice or an image. Therefore, the output device 140 can output the generated first and second replacement information providing messages 510 and 520, as the voice or the image through at least one of the display device 141 and the audio output device 143.

In a state that the replacement information providing message is output, when a user command related to the replacement information provision is received, the control device 130 can control the output device 140 to receive and output the replacement response information related to the user voice through at least one of the web server 300 and the SNS server 400.

When a user command for performing the web search is received from the user, the control device 130 receives web search result information from the web server 300 based on the utterance elements related to the main nouns or objects received from the second server 20. After the web search result information is received, the output device 140, depending on the control command of the control device 130, outputs the web search result information in an image or in a voice through at least one of the display device 141 and the audio output device 143.

After a user command for the SNS is received from the user, the control device 130 generates a response request message based on the utterance elements related to the main nouns or objects received from the second server 20. Then, the control device 130 sends the response request message to the SNS server 400 to provide SNS through the communication device 110, and receives a response message related to the response request message from the SNS server 400. According to an embodiment of the present disclosure, the control device 130 can send the response request message to the SNS server 400 through a SNS account of the user, and receive the response message related to the response request message from a SNS account linked with the SNS account of the user from the SNS server 400.

According to another embodiment of the present disclosure, the control device 130 can receive the response message related to the response request message from a SNS account, selected by the user among SNS accounts linked with the SNS account of the user. If there is a SNS account selected by the user, among SNS accounts linked with the SNS account of the user, the control device 130 can request the SNS server 400 to send the response request message to the SNS account selected by the user. Accordingly, the SNS server 400 sends the response request message to the SNS account selected by the user. When a response message related to the response request message is received from the SNS account, the SNS server 400 sends it to the display apparatus 100. Therefore, the control device 130 can receive the response message related to the response request message from the SNS account selected by the user.

Figure 6:
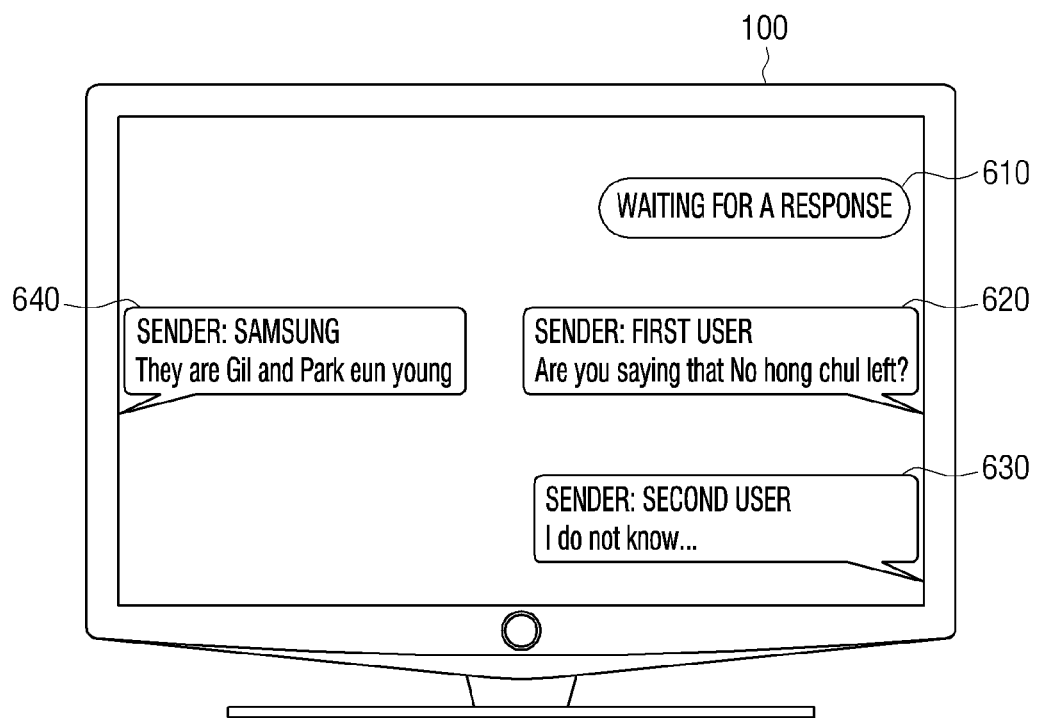
FIG. 6 is a diagram illustrating a display apparatus according to an embodiment of the present disclosure which provides a response message related to a user voice through SNS.

FIG. 6 is an example diagram illustrating a display apparatus, according to an embodiment of the present disclosure, which provides response messages related to user voice through SNS.

As illustrated in FIG. 6, the output device 140, according to the control command of the control device 130, can output the response message received from the SNS server 400 in a text image form through the display device 141. The control device 130 can receive response messages from first and second user SNS, accounts among a plurality of SNS accounts, linked with the SNS account of the user through the SNS server 400. After the response messages are received from the first and second user SNS accounts, the output device 140, according to the control command of the control device 130, outputs the response messages received from the first and second user SNS accounts through at least one of the display device 141 and the audio output device 143.

As illustrated in FIG. 6, when a response message of "Are you saying that No hong chul left?" is received from the first user SNS account through the SNS server 400, the display device 141 outputs a first response message 620 of "sender: first user" and "Are you saying that No hong chul left?" on the screen. Then, when a response message of "I do not know." is received through the SNS server 400 from the second user SNS account, the display device 141 outputs a second response message 630 of "sender: second user" and "I do not know." on the screen.

If the user has no SNS account, the control device 130 can receive the response message related to the response request message from a SNS account, linked with a predetermined public SNS account. The response request message that is sent to the SNS server 400 may include user information to identify whether the user SNS account is registered. Accordingly, after the response request message is received, the SNS server 400 checks whether the SNS account of the corresponding user is registered, referring to the user information included in the received response request message. From the check result, if the user SNS account is checked not to be registered, the SNS server 400 sends the response request message to a SNS account linked with the public SNS account through the predetermined public SNS account. After the response message related to the response request message is received from the linked SNS account, the response message is sent it to the display apparatus 100.

According to a control command of the control device 130, the output device 140 can output the response message received from the SNS server 400 in a text image form through the display device 141. As illustrated in FIG. 6, the display device 141, outputs a third response message 640 of "sender: Samsung" and "They are Gil and Park eun young".

After the response message is received through the SNS server 400 from the SNS account linked with the SNS account of the user or the public SNS account, the control device 130 can control the output device 140 to output notice information indicating that the response message has been received. Accordingly, the output device 140, according to the control command of the control device 130, can output the notice information to notify reception of the response message in voice through the audio output device 143.

However, the present disclosure is not limited to the above embodiments. When the response message is received through the SNS server 400 from the SNS account linked with the user SNS account or the public SNS account, the control device 130 can control the output device 140 to highlight and output the received response message. Accordingly, the output device 140, according to the control command of the control device 130, can highlight and output the response message that is currently received, among the response messages output in an image on the screen through the display device 141.

In FIG. 6, the display device 141 displays an indication mark 610 of "Waiting for a response" on the top of the screen while receiving the response message from the SNS account linked with the user SNS account or the public SNS account through the SNS server 400. While the indication mark 610 is being displayed, the display device 141 can receive the response message from the SNS account linked with the user SNS account or the public SNS account, through the SNS server 400.

If there is a response message which the user wants, among the response messages that are output on the screen, the user can stop receiving response messages. If the user command is received, the control device 130 generates a receiving stop request message for SNS, and sends the generated receiving stop request message to the SNS server 400. Accordingly, from a time the receiving stop request message is received, the SNS server 400 terminates transfer of the response message received from the SNS account linked with the user SNS account or the public SNS account.

Hereinafter, the detailed configuration of the above-described display apparatus 100 will be explained.

Figure 7:
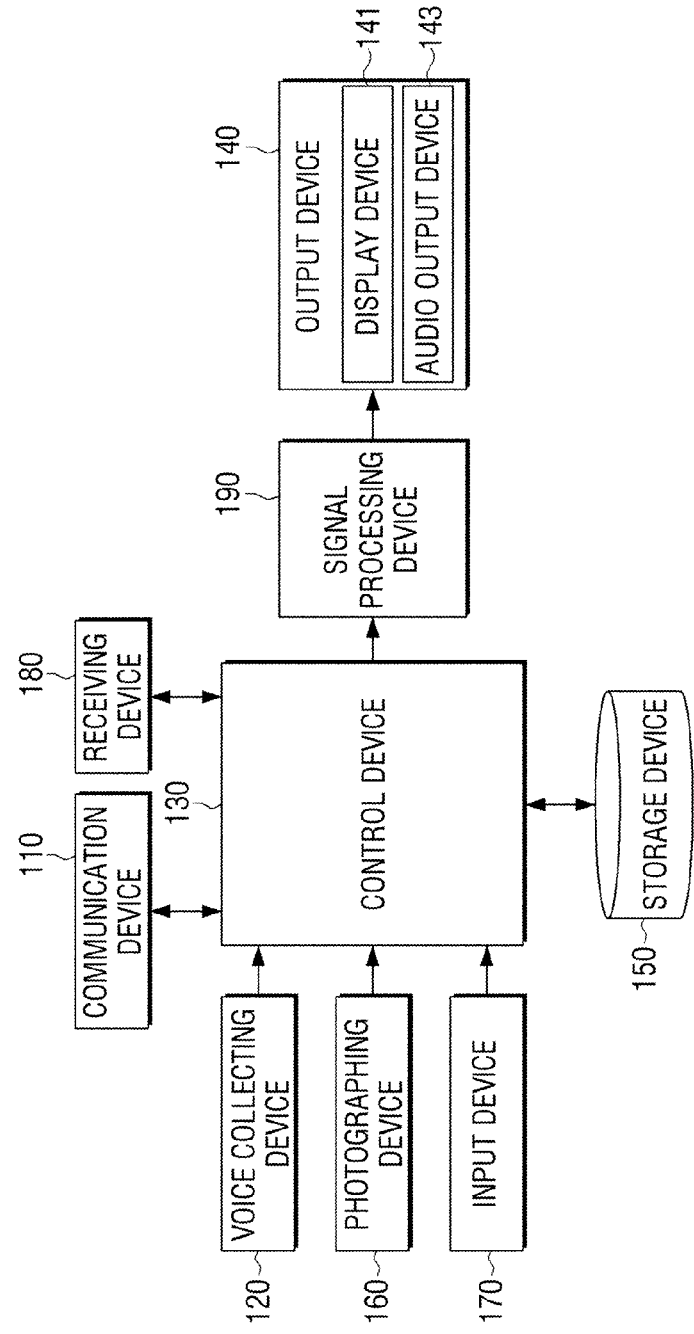
FIG. 7 is a block diagram for explaining a detailed configuration of a display apparatus according to an embodiment of the present disclosure.

FIG. 7 is a block diagram for explaining a detailed configuration of a display apparatus according to an embodiment of the present disclosure.

As illustrated in FIG. 7, in addition to the components in FIG. 4, the display apparatus 100 may further include a photographing device 160, an input device 170, a receiving unit 180, and a signal processing device 190. The components in FIG. 6 that overlap the components in FIG. 5 have the same functions. Therefore, detailed descriptions will be omitted.

The photographing device 160 photographs a face of the user to generate a face image. The above-described storage device 150 can also match face images of the users and the user information. Then, the storage device 150 can store face images of the user and the user information. Accordingly, after the face image of the user captured through the photographing device 160 is generated, the control device 130 obtains user information to be matched with the generated face image from the storage device 150. Then, the control device 130 can send the obtained user information and the text information for the user voice to the second server 20.

Accordingly, when the utterance element extracted from the received text information for the user voice is the limited utterance element, the second server 20 determines whether to generate response information corresponding to the user voice based on the received user information. Then, depending on the determination result, the second server 20 generates the response information corresponding to the user voice or a non-provisionable message for the response information corresponding to the user voice. Then, the second server 20 sends the response information or the non-provisionable message to the display apparatus 100. Therefore, as described above, the control device 130 performs an function based on the response information corresponding to the user voice received from the second server 20 or controls the output device 140 to output a notice message, e.g., "Voice is limited.

Please re-enter" through at least one of a voice and an image based on the non-provisionable message for the response information.

The input device 170 is an input means that receives various manipulations of the user and sends them to the control device 130. The input device 170 may be implemented as an input panel. The input panel may be configured of a touch pad, e.g., a key pad including various function keys, number keys, special keys, character keys, etc., or a touch screen method. In addition, the input device 170 may be implemented as an IR receiving unit (not illustrated) for receiving a remote signal transmitted from a remote controller to control the display apparatus 100.

The input device 170 can receive various user operations to control the functions of the display apparatus 100. For example, if the display apparatus 100 is implemented as a smart TV, the input device 170 can receive user operations to control the functions of the smart TV, e.g., power on/off, channel changing, volume changing, etc. When the user operations are input through the input device 170, the control device 130 can control other components to perform various functions corresponding to the user operations that are input through the input device 170. For example, when a power off command is input, the control device 130 can shut off the power that is supplied to each of the components of the display apparatus 100. When a channel changing command is input, the control device 130 can control the receiving unit 180 to tune in to a channel selected by a user operation.

In addition, the input device 170 receives a user command to start a voice recognition mode to collect the user voice. After the user command to start the voice recognition mode is input through the input device 170, the control device 130 can activate the voice collecting device 120 and collect user voices uttered within a predetermined distance.

The above-described storage device 150 is a storage medium, in which various programs needed to operate the display apparatus 100 are stored, and may be implemented as a memory, a hard disk drive (HDD), etc. For example, the storage device 150 may include at least one ROM to store programs for performing the operation of the control device 130, at least one RAM to temporarily store data formed according to the operation performed by the control device 130, etc. Also, the storage device 150 may further include at least one electrically erasable and programmable ROM (EE-PROM) to store various reference data, etc.

The storage device 150 can store various response messages appropriate to the user voice as voice or text information. Then, the control device 130 can read voice information or text information for the response message appropriate to the user voice from the storage device 150. The control device 130 can output voice information or text information through at least one of the display device 141 and the audio output device 143. In detail, when outputting the response message appropriate to the user voice in a voice form, the control device 130 can perform signal processing, e.g., decoding, etc., about the voice information read from the storage device 150, amplify the decoded voice data, and output the decoded voice data through the audio output device 143. Also, when outputting the response message appropriate to the user voice in a text form, the control device 130 can perform signal processing, e.g., decoding, etc., about the text information read from the storage device 150, form a UI screen on which texts configuring the text information are included, and output the texts through the display device 141.

However, the present disclosure is not limited. The control device 130 can perform a processing operation for a response message included within the response information received from the second server 20, and output the response message in text-related image or in voice through at least one of the display device 141 and the audio output device 143.

The receiving unit 180 receives contents related to broadcast programs through a broadcast network. In detail, the receiving unit 180 can receive contents from broadcast stations transmitting contents related to the broadcast programs through the broadcast network or web servers that transmit content files through the internet. Also, the receiving unit 180 can receive contents from various recording media playback devices that are provided within the display apparatus 100 or connected to the display apparatus 100. The recording media playback devices refer to apparatuses that play contents stored in various types of recording media, e.g., CDs, DVDs, hard disks, Blue-ray disks, memory cards, USB memories, etc.

When receiving contents from the broadcast stations, the receiving unit 180 may be implemented in a configuration including a tuner (not illustrated), a demodulator (not illustrated), an equalizer (not illustrated), etc. When receiving contents from a source device, e.g., a web server, the receiving unit 180 may be implemented as a network interface card (not illustrated). Also, in the case of embodiments that receive contents from various recording media playback devices, the receiving unit 180 may be implemented as an interface unit (not illustrated) connected to the recording media playback device. As described above, according to embodiments, the receiving unit 180 may be implemented in various forms.

The signal processing device 190 performs signal processing for the contents such that the contents received through the receiving unit 180 can be output through the output device 140. The signal processing device 190 performs signal processing, e.g., decoding, scaling, frame rate changing, etc., for the video signals so that the video signals included within the contents can be output in a form capable of being output on the display device 141. Also, the signal processing device 190 performs signal processing, e.g., decoding, etc., about the audio signal so that the audio signals included in the contents can be output in a form capable of being output through the audio output device 143. Then, the display device 141 and the audio output device 143 can output video and audio signals included in the contents signal-processed by the signal processing device 190.

Functions of the display apparatus 100, according to an embodiment of the present disclosure, that receives response information appropriate to the user voice through the interactive server 200 including the first and second servers 10 and 20 and performs the corresponding operations have been explained. Hereinafter, operation of the second server 20 of the interactive server 200 according to an embodiment of the present disclosure that generates response information appropriate to the user voice received through the display apparatus 100, and sends the response information to the display apparatus 100 will be explained.

Figure 8:
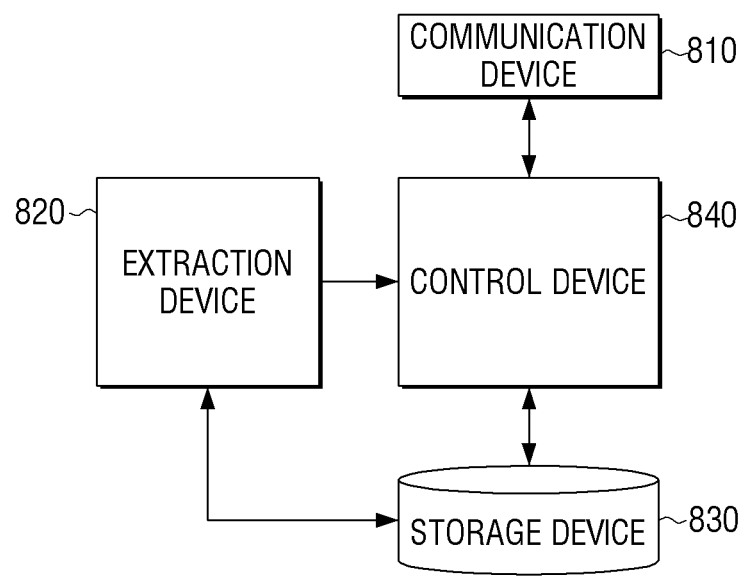
FIG. 8 is a block diagram illustrating an interactive server according to an embodiment of the present disclosure.

FIG. 8 is a block diagram illustrating an interactive server according to an embodiment of the present disclosure.

The interactive server, as illustrated in FIG. 8, is the above-described second server 20, and is a server that receives the user voice converted into text information through the first server 10 from the display apparatus 100, extracts utterance elements from the received text information for the user voice, and sends response information appropriate to the user voice to the display apparatus 100. The interactive server includes a communication device 810, an extraction device 820, a storage device 830, and a control device 840.

The communication device 810 performs communication with the display apparatus 100, and the extraction device 820 extracts the utterance elements from the user voice received from the display apparatus 100 through the communication device 810. As described above, the extraction device 820, after text information for the user voice is received, can extract utterance elements including a dialog act, a main goal, and a core element from the received text information. Detailed descriptions of the utterance elements will be hereinafter omitted.

The storage device 830 is storing the user voice discourse history information and EPG information. The control device 840 generates response information corresponding to the user voice in different forms based on the functions that are classified depending on the utterance elements for the user voice extracted through the extraction device 820. Then, the control device 840 sends response information to the display apparatus 100. The functions classified depending on the utterance elements may include at least one of EPG related functions and function control of the display apparatus 100. Depending on the utterance elements extracted from the user voice, the control device 840 determines whether the user voice is related to the EPG or function control of the display apparatus 100. The control device 840 can generate response information corresponding to the user voice according to the determination result.

When the utterance element extracted from the user voice is an utterance element related to the EPG, the control device 840 determines whether or not EPG information corresponding to the user voice can be provided based on the EPG information pre-stored in the storage device 830. From the determination result, if the EPG information can be provided, the control device 840 generates response information corresponding to the user voice based on the EPG information.

For example, if a user voice is "Record (inserted broadcast program name) that is broadcast this week", the extraction device 820 can extract the utterance elements of "this week", "(inserted broadcast program name)", "record". After the utterance elements are extracted, the control device 840 can obtain program information and start time information for (inserted broadcast program name) from the EPG information stored in the storage device 830. Accordingly, the control device 840 can generate response information, including a control command related to a schedule recording for the (inserted broadcast program name) generated based on the obtained program information and start time information, and a response message generated based on the disclosure history information pre-stored in the storage device 830. After the response information corresponding to the user voice is generated, the control device 840 sends it to the display apparatus 100 through the communication device 810. Accordingly, the display apparatus 100 can perform at least one of output of the response message and execution of the function corresponding to the user voice based on the received response information.

From the determination result, if it is impossible to provide the EPG information, the control device 840 generates a non-provisionable message for response information corresponding to the user voice.

For example, if the user voice is "Who is the hero in (inserted_broadcast program name)?", the extraction device 820 can extract utterance elements of "(inserted broadcast program name)", "hero", "who". After the utterance elements are extracted, the control device 840 checks whether there is hero information for (inserted broadcast program name) in the EPG information stored in the storage device 830. From the check result, if it is impossible to obtain the hero information for (inserted broadcast program name) from the pre-stored EPG information, the control device 840 can generate a non-provisionable message for the response information corresponding to the user voice.

As another example, related to generation of the non-provisionable message for the response information, when the utterance elements extracted from the user voice are the limited forbidden words, e.g., abusive language, prohibited drugs, etc., the control device 840 can generate the non-provisionable message for the response information corresponding to the user voice.

When the response information corresponding to the user voice or the non-provisionable message for the response information corresponding to the user voice is generated, the control device 840 sends the response information to the display apparatus 100 through the communication device 810. In addition, the control device 840 can send utterance elements related to main nouns or objects, among the utterance elements extracted from the user voice, to the display apparatus 100. The display apparatus 100 can receive at least one of web search result information and a response message, based on the received utterance elements through a web server and a SNS server. Then, the display apparatus 100 can output the at least one of web search result information and a response message in at least one of a voice and an image.

The configuration of an interactive server, according to an embodiment of the present disclosure that provides response information appropriate to the user voice, has been explained. Hereinafter, a method for performing operations, based on the response information appropriate to the user voice in the above-described display apparatus, will be explained.

Figure 9:
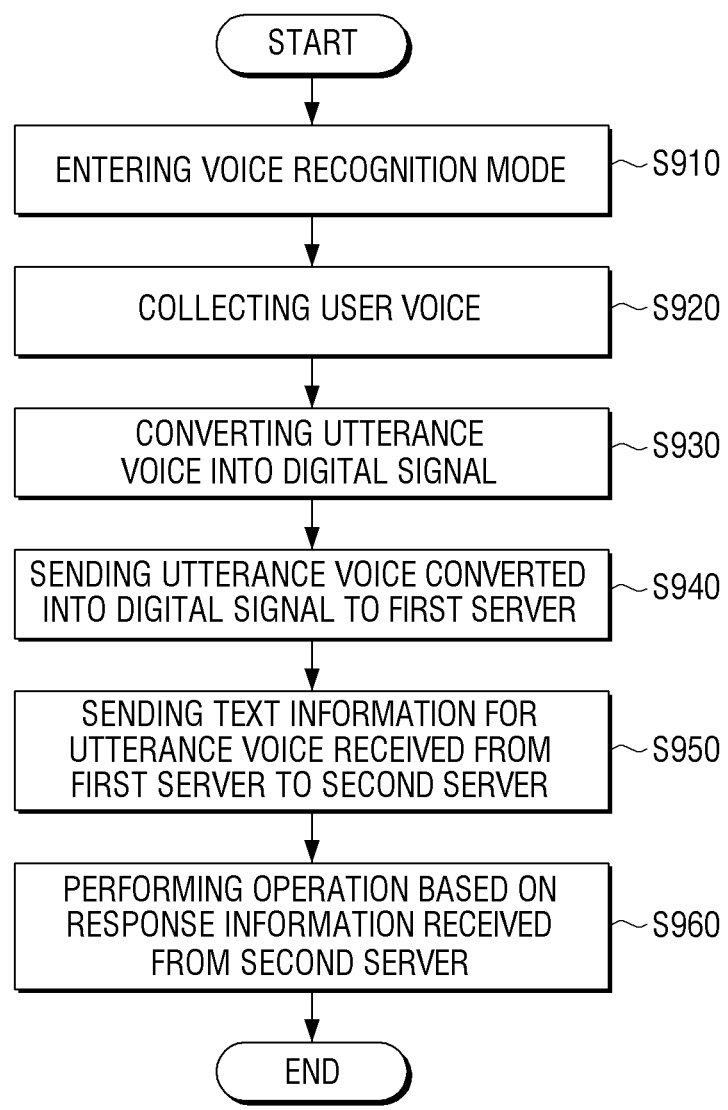
FIG. 9 is a flowchart illustrating a method for receiving response information appropriate to a user voice in a display apparatus according to an embodiment of the present disclosure.

FIG. 9 is a flowchart illustrating a method for receiving response information appropriate to a user voice in a display apparatus, according to an embodiment of the present disclosure.

After a user command to start a voice recognition mode is input from the user, the display apparatus enters the voice recognition mode. The voice recognition mode can recognize a user voice depending on the input user command (S910). When the voice recognition mode is entered, the display apparatus receives the user voice from the user. When the user voice is input, the display apparatus collects the inputted user voice, and converts the collected user voice into digital signals (S920 and S930). Then, the display apparatus sends the user voice, converted into the digital signals, to a first server (S940). The first server may be a server that converts the user voice, which was converted into the digital signal, into text information. After the text information for the user voice is received from the first server, the display apparatus sends the received text information for the user voice to the second server (S950). The second server may be a server that generates response information, appropriate to the user voice, depending on the utterance element extracted from the user voice.

After the response information, corresponding to the user voice, is received from the interactive server, the display apparatus performs functions corresponding to the user voice based on the received response information (S960). The response information may be generated in different forms, depending on the functions classified based on the utterance element extracted from the user voice. The function, classified based on the extracted utterance element, may include at least one of EPG related functions and functions related to an function control of the display apparatus. For example, if the utterance element, extracted from the user voice, is an utterance element related to a broadcast program, the response information may be the EPG related function. If the utterance element is an utterance element related to power on/off, channel changing, volume changing, etc. of the display apparatus, the response information may be a function related to an function control of the display apparatus. Then, after the response information is received from the second server, the display apparatus can output a response message included in the received response information in a voice or an image. The display apparatus can perform an operation for the execution of the function of the display apparatus, depending on a control command included in the response information received from the second server.

If a non-provisionable message for the response information, corresponding to the user voice based on the utterance element extracted from the user voice, is received, the display apparatus receives replacement response information through at least one of web search and SNS. Then, the display apparatus outputs the replacement response information in an image and a voice.

Figure 10:
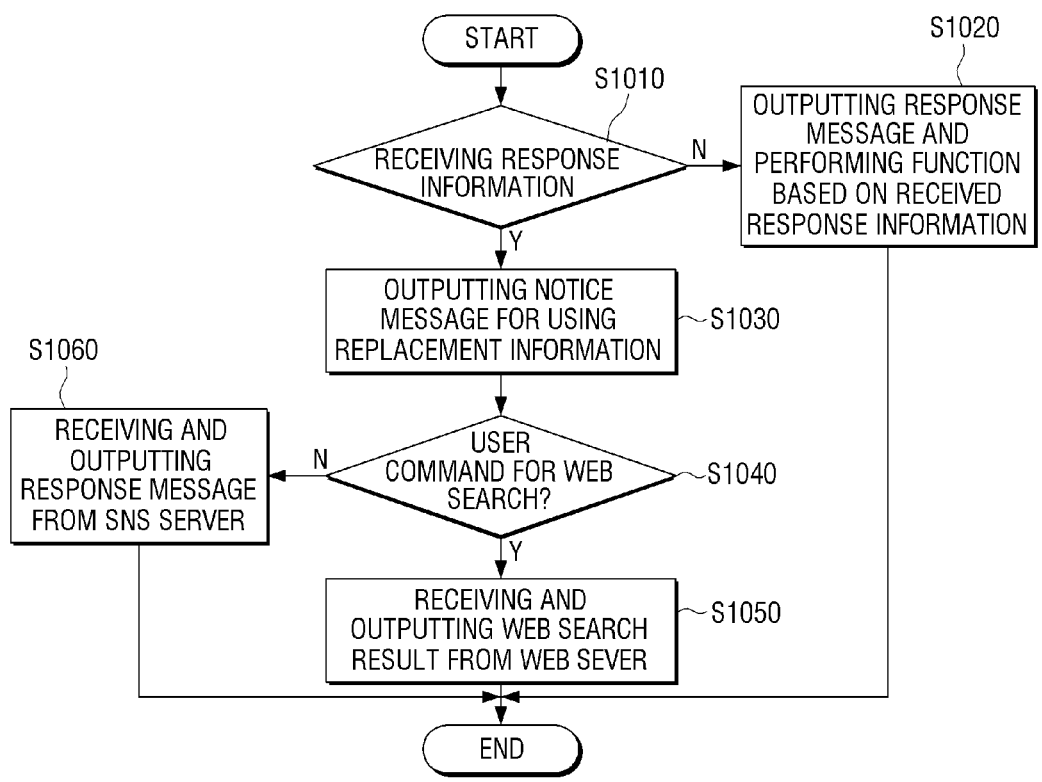
FIG. 10 is a flowchart illustrating a method for providing replacement response information related to a user voice in a display apparatus according to an embodiment of the present disclosure.

FIG. 10 is a flowchart illustrating a method for providing replacement response information related to user voice in a display apparatus, according to an embodiment of the present disclosure.

As illustrated in FIG. 10, the display apparatus checks whether the response information, corresponding to the user voice, is received from the second server 20 (S1010). From the check result, if the response information corresponding to the user voice is received from the second server 20, the display apparatus outputs the response message through at least one of a voice and an image or performs operations for the execution of the functions of the display apparatus based on the received response information (S1020).

From the check result, if the non-provisionable message for the response information corresponding to the user voice is received from the second server 20, the display apparatus outputs a notice message, e.g., "Function can not be performed" or "Voice is limited. Please re-enter" through at least one of a voice and a text form image (S1030). After outputting the message, the display apparatus outputs a replacement information providing message through at least one of a voice and an image in order to provide replacement information through at least one of the web search and the SNS.

As described with reference to FIG. 5, the display apparatus outputs the notice message based on the non-provisionable message received from the second server 20. The display apparatus can output a first replacement information providing message 510 related to the web search of "Would you like to web search for ((inserted broadcast program name), No hong chul)?", and a second replacement information providing message 520 related to the SNS of "Do you want to ask your registered SNS friends?" in a text form on a screen. Then, the audio output device 143 can output the first replacement information providing message 510 related to the web search of "Would you like to web search for ((inserted broadcast program name), No hong chul)?" and the second replacement information providing message 520 related to the SNS of "Do you want to ask your registered SNS friends?" in an audible form of a voice through a speaker (not illustrated).

When the replacement information providing message is output, the display apparatus checks whether a user command related to the replacement information provision is received from the user (S1040). From the check result, if a user command for performing the web search is received from the user, the display apparatus receives web search result information from the web server 300 based on the utterance elements related to the main nouns or objects received from the second server 20. Then, the display apparatus outputs the web search result information through at least one of an image and a voice (S1050).

If a user command for the SNS is checked, and received from the user at step 1040, the display apparatus generates a response request message based on the utterance elements related to the main nouns or objects received from the second server 20. Then, the display apparatus sends the response request message to the SNS server 400 to provide SNS. The display apparatus receives a response message, related to the response request message, from the SNS server 400. Then, the display apparatus outputs the received response message through at least one of an image and a voice (S1060).

According to an embodiment, the display apparatus sends the response request message to the SNS server 400 through the SNS account of the user. Then, the display apparatus can receive the response message, related to the response request message, from a SNS account linked with the SNS account of the user from the SNS server 400.

According to another embodiment, the display apparatus can receive the response message, related to the response request message, from a SNS account selected by the user, among the SNS accounts linked with the SNS account of the user. When there is the SNS account selected by the user, among the SNS accounts linked with the SNS account of the user, the display apparatus can request the SNS server 400 to send the response request message to the SNS account selected from the user. Then, the SNS server 400 sends the response request message to the SNS account selected from the user. When a response message, related to the response request message, is received from the corresponding SNS account, the SNS server 400 sends the response message to the display apparatus 100. Accordingly, the display apparatus can receive the response message, related to the response request message from the SNS account selected from the user.

As illustrated in FIG. 6, if the response message, related to the response request message, is received from at least one SNS account, among the SNS accounts linked with the SNS account of the user. Then, the display apparatus can output the received response message on the screen. As described with reference to FIG. 6, the display apparatus can receive response messages from SNS accounts of the first and second users, among the plurality of SNS accounts linked with the SNS account of the user through the SNS server 400. The response message of "Are you saying that No hong chul left?" may be received from the SNS account of the first user, and the response message of "I do not know . . . " may be received from the SNS account of the second user.

The display apparatus can output the first response message 620 of "sender: first user" and "Are you saying that No hong chul left?", and the second response message 630 of "sender: second user" and "I do not know . . . " on the screen.

If the user has no SNS account, the display apparatus can receive the response message related to the response request message from a SNS account liked with a predetermined public SNS account. The response request message, sent to the SNS server 400, may include user information to identify whether the user SNS account is registered. Accordingly, after the response request message is received from the display apparatus, the SNS server 400 checks whether the SNS account of the corresponding user is registered by referring to the user information included in the received response request message. From the check result, if the user SNS account is checked as not to be registered, the SNS server 400 sends the response request message to a SNS account linked with the public SNS account, through the predetermined public SNS account. Then, after the response message is received from the SNS account, in which the response request message was sent, the SNS server 400 sends the received response message to the display apparatus.

As illustrated in FIG. 6, when the response request message is sent, and the response message corresponding to the response request message is received through the public SNS account, the display apparatus outputs a third response message 640 of "sender: Samsung" and "They are Gil and Park eun young" on the screen.

If the response message is received from the SNS account, linked with the SNS account of the user or the public SNS account through the SNS server 400, the display apparatus can not only output the received response message on the screen, but also can output the notice information in voice indicating that the response message has been received. If the response message is received from the SNS account, linked with the SNS account of the user or the public SNS account through the SNS server 400, the display apparatus can highlight and output the received response message.

In the display apparatus, which receives the response message related to the user voice through the SNS according to the user command, when a user command related to stopping receiving the response message is received, the display apparatus generates a receiving stop request message for SNS, and sends the receiving stop request message to the SNS server 400. Accordingly, from a time the receiving stop request message is received, the SNS server 400 terminates transfer for the response message received from the SNS account linked with the user SNS account or the public SNS account.

Exemplary embodiments of the present disclosure have been described. The voice collecting device 120 may include a voice recorder, a microphone, etc. However, the voice collecting device 120 is not limited, and may include any hardware for collecting a user voice. The communication device 110 may include a wireless router, a hardware circuit, or any hardware module for performing mobile communication with external networks. The control device 130 may include a processor for controlling an operation corresponding to the user voice. The output device 140 may include any hardware for outputting an image and a voice.

While the embodiments of the present disclosure have been described, additional variations and modifications of the embodiments may occur to those skilled in the art. Therefore, it is intended that the appended claims shall be construed to include both the above embodiments and all such variations and modifications that fall within the spirit and scope of the embodiments.

What is claimed is:

1. A display apparatus comprising:
a voice collecting device configured to collect a user voice;
a communication device configured to communicate with an interactive server, a web server, and a social network service (SNS) server; and
a control device configured to:
in response to response information corresponding to the user voice that is sent to the interactive server, being received from the interactive server, perform a feature corresponding to the response information; and
in response to a non-provisionable message for the response information corresponding to the user voice, being received from the interactive server, as it is not possible for the interactive server to provide the response information corresponding to the user voice, control the communication device to receive replacement response information, related to the user voice, through a web search and an SNS via the web server and the SNS server.

2. The display apparatus of claim 1, further comprising an output device, wherein the control device is further configured to, in response to an utterance element that is extracted from the user voice and sent to the web server and the SNS server, and the non-provisionable message, being received from the interactive server:
  control the communication device to receive, from the web server, a result of the web search using the utterance element, and receive, from the SNS server, a user message responding to the utterance element; and
  control the output device to output the result of the web search and the user message.

3. The display apparatus of claim 2, wherein the control device is further configured to, in response to a user command for performing the web search being received:
  control the communication device to receive the result of the web search from the web server; and
  control the output device to output the result of the web search.

4. The display apparatus of claim 2, wherein the control device is further configured to, in response to a user command for an SNS being received:
  generate a response request message requesting a response to the utterance element;
  control the communication device to transmit the response request message to the SNS server providing the SNS;
  control the communication device to receive, from the SNS server, the user message responding to the response request message; and
  control the output device to output the user message.

5. The display apparatus of claim 4, wherein, depending on the user command, the control device is further configured to:
  control the communication device to transmit the response request message to an SNS account of a user;
  control the communication device to receive the user message from another SNS account that is linked with the SNS account of the user; and
  control the output device to output the user message.

6. The display apparatus of claim 4, wherein, depending on the user command, the control device is further configured to:
  control the communication device to transmit the response request message to an SNS account that is selected among SNS accounts linked with another SNS account of a user;
  control the communication device to receive the user message from the selected SNS account; and
  control the output device to output the user message.

7. The display apparatus of claim 4, wherein, depending on the user command, the control device is further configured to:
  control the communication device to transmit the response request message to a predetermined public SNS account;
  control the communication device to receive the user message from an SNS account that is linked with the predetermined public SNS account; and
  control the output device to output the user message.

8. The display apparatus of claim 4, wherein the control device is further configured to, in response to the communication device receiving the user message control the output device to output notice information indicating that the user message is received.

9. The display apparatus of claim 1, wherein the interactive server comprises:
  a first server configured to convert a digital signal corresponding to the user voice into text information; and
  a second server configured to generate the response information based on the text information,
  wherein the control device is further configured to:
    convert the user voice into the digital signal;
    control the communication device to transmit the digital signal to the first server; and
    in response to the text information being received from the first server, control the communication device to transmit the text information to the second server, and receive the response information from the second server.

10. The display apparatus of claim 9, wherein the control device is further configured to, in response to the user voice comprising utterance elements related to an electronic program guide or a control operation of the display apparatus:
  output the response information; and/or
  execute a function corresponding to the user voice based on the response information.

11. A response information providing method of providing response information appropriate to a user voice in a display apparatus, the response information providing method comprising:
  collecting the user voice;
  transmitting the collected user voice to an interactive server;
  determining whether response information corresponding to the user voice is received from the interactive server;
  performing a feature corresponding to the user voice based on the response information in response to the determining that the response information corresponding to the user voice is received; and
  in response to a non-provisionable message for the response information corresponding to the user voice, being received from the interactive server, as it is not possible for the interactive server to provide the response information corresponding to the user voice, receiving and outputting replacement response information related to the user voice through a web search and a social network service (SNS) via a web server and an SNS server.

12. The response information providing method of claim 11, wherein the performing further comprises, in response to an utterance element that is extracted from the user voice and sent to the web server and the SNS server, and the non-provisionable message, being received from the interactive server:
  receiving, from the web server, and outputting a result of the web search using the utterance element; and
  receiving, from the SNS server, and outputting a user message responding to the utterance element.

13. The response information providing method of claim 12, wherein the performing further comprises, in response to a user command for performing the web search being received, receiving, from the web server, and outputting the result of the web search.

14. The response information providing method of claim 12, wherein the performing further comprises, in response to a user command for an SNS being received:
  generating a response request message requesting a response to the utterance element;
  transmitting the response request message to the SNS server providing the SNS; and
  receiving, from the SNS server, and outputting the user message responding to the response request message.

15. The response information providing method of claim 14, wherein the performing further comprises, depending on the user command:
  transmitting the response request message to an SNS account of a user; and receiving, from another SNS account that is linked with the SNS account of the user, and outputting the user message.

16. The response information providing method of claim 14, wherein the performing further comprises, depending on the user command:
   transmitting the response request message to an SNS account that is selected among SNS accounts linked with another SNS account of a user; and
   receiving, from the selected SNS account, and outputting the user message.

17. The response information providing method of claim 14, wherein the performing further comprises, depending on the user command:
   transmitting the response request message to a predetermined public SNS account; and
   receiving from a SNS account that is linked with the predetermined public SNS account, and outputting the user message.

18. The response information providing method of claim 14, wherein the performing further comprises outputting notice information indicating that the user message is received in response to the receiving the user message.

19. The response information providing method of claim 11, wherein the interactive server comprises:
   a first server converting a digital signal corresponding to the user voice into text information; and
   a second server generating the response information based on the text information,
   wherein the transmitting comprises:
      converting the user voice into the digital signal;
      transmitting the digital signal to the first server;
      receiving the text information from the first server;
      transmitting the text information to the second server; and
      receiving the response information from the second server.

20. The response information providing method of claim 19, wherein the performing further comprises, in response to the user voice comprising utterance elements related to an electronic program guide or a control operation of the display apparatus:
   outputting the response information; and/or
   executing a function corresponding to the user voice based on the response information.

21. A display apparatus comprising:
   a voice collecting device configured to:
      collect a user voice; and
      remove noise from the collected user voice to generate a filtered user voice;
   a photographing device configured to photograph a face of a user to generate a face image;
   a communication device configured to:
      transmit the filtered user voice and the face image to an interactive server; and
      receive, from the interactive server, response information appropriate to the filtered user voice and the face image; and
   a control device configured to:
      perform an operation corresponding to the filtered user voice and the face image based on the response information; and
      in response to a non-provisionable message for the response information corresponding to the filtered user voice, being received from the interactive server, as it is not possible for the interactive server to provide the response information corresponding to the filtered user voice, control the communication device to receive replacement response information related to the filtered user voice through a web search and an SNS via a web server and an SNS server.

22. The display apparatus of claim 21, wherein the control device is further configured to, in response to an utterance element that is extracted from the user voice and sent to the web server and the SNS server, and the non-provisionable message being received from the interactive server, control the communication device to receive, from the web server, a result of web search using the utterance element, and receive, from the SNS server, a user message responding to the utterance element.

23. An interactive system providing response information appropriate to a user voice, the interactive system comprising:
   a display apparatus configured to recognize the user voice; and
   an interactive server configured to, in response to the user voice being received from the display apparatus:
      convert the user voice into text information;
      analyze the text information; and
      transmit, to the display apparatus, response information corresponding to the user voice based on the analyzed text information,
   wherein the display apparatus is further configured to:
      perform a function corresponding to the response information in response to the response information being received from the interactive server;
      in response to a non-provisionable message for the response information corresponding to the user voice, being received from the interactive server, as it is not possible for the interactive server to provide the response information corresponding to the user voice, receive replacement response information related to the user voice through a web search and an SNS via the web server and the SNS server; and
      perform a function related to the user voice based on the replacement response information.

* * * * *